United States Patent [19]
Smith et al.

[11] Patent Number: 5,884,281
[45] Date of Patent: Mar. 16, 1999

[54] ELECTRONIC GROCERY LISTER

[76] Inventors: Samuel Bernard Smith; Kellie Ann Martin, both of 8257 Williams Ave., Philadelphia, Pa. 19150

[21] Appl. No.: 715,622

[22] Filed: Sep. 18, 1996

Related U.S. Application Data

[60] Provisional application No. 60/003,958 Sep. 19, 1995.

[51] Int. Cl.$^6$ .................................................. G06F 17/30
[52] U.S. Cl. ................................................................ 705/26
[58] Field of Search ................................. 705/5, 17, 22, 705/23, 26, 29

[56] References Cited

U.S. PATENT DOCUMENTS

| | | |
|---|---|---|
| D. 309,293 | 7/1990 | Helbig . |
| D. 313,401 | 1/1991 | Tanabe . |
| D. 315,895 | 4/1991 | Paine et al. . |
| 4,026,050 | 5/1977 | Boles . |
| 4,734,858 | 3/1988 | Schlafly ................................. 364/408 |
| 4,742,911 | 5/1988 | Manuel . |
| 4,807,169 | 2/1989 | Overbeck . |
| 4,833,632 | 5/1989 | Nishimura et al. . |
| 4,972,318 | 11/1990 | Brown et al. ............................ 364/403 |
| 4,984,155 | 1/1991 | Geier et al. ............................. 364/401 |
| 5,237,651 | 8/1993 | Randall . |
| 5,250,789 | 10/1993 | Johnsen . |
| 5,253,441 | 10/1993 | Rachiele et al. . |
| 5,345,071 | 9/1994 | Dumont . |
| 5,424,524 | 6/1995 | Ruppert et al. . |
| 5,435,087 | 7/1995 | Karkar et al. ............................ 40/575 |
| 5,515,268 | 5/1996 | Yoda ..................................... 364/401 |
| 5,664,110 | 9/1997 | Green et al. ............................. 705/26 |
| 5,694,546 | 12/1997 | Reisman .............................. 395/200.9 |

FOREIGN PATENT DOCUMENTS

| | | |
|---|---|---|
| 2748951 | 5/1979 | Germany . |
| 2754919 | 6/1979 | Germany . |
| 56-137460 | 10/1981 | Japan . |

Primary Examiner—Eric W. Stamber
Attorney, Agent, or Firm—Richard C. Litman

[57] ABSTRACT

An electronic grocery lister, which stores, displays and prints grocery list items. The device includes a computer which stores names of grocery items according to broad classifications. An user may scroll through the names of grocery items which are already loaded into the computer and viewable on a small screen. A user may mark those items he or she desires to purchase and, if wished, may retrieve and (in the second and third embodiments) print all entered items. A first embodiment is portable. A second embodiment is not portable, but includes a printer. A third embodiment includes a modem by which a user can shop on-line at grocery stores having the necessary computer hardware and software.

12 Claims, 4 Drawing Sheets

ELECTRONIC GROCERY LISTER

CROSS REFERENCE TO RELATED APPLICATION

This application claims the benefit of Provisional patent application Ser. No. 60/003,958 filed Sep. 19, 1995 now abandoned.

BACKGROUND OF THE INVENTION

1. Field of the Invention

The present invention relates to an electronic device for creating, storing, and retrieving, displaying and/or printing grocery lists.

2. Description of the Prior Art

The present invention is an electronic grocery sister, with three preferred embodiments. The first embodiment is portable, the second embodiment is designed for use only at home, and the third embodiment includes a modem for shopping at home. It will be seen that none of the prior inventions for mechanical grocery listers or electronic devices are equivalent to the present invention.

U.S. Pat. No. 4,026,050, issued on May 31, 1977, to Bruce Aaron Boles, discloses a device for creating a grocery shopping list, with members having the names of grocery items written on them, that are turned to indicate what items are needed. The instant invention is distinguishable, in that it uses electronic rather than mechanical means to create a grocery list.

U.S. Pat. No. 4,742,911, issued on May 10, 1988, to Roosevelt R. Manuel, discloses a grocery list device, being a box with index strips having the names of different items, and indicators clipped onto the index strips to indicate items to be purchased. The instant invention is distinguishable, in that it uses electronic rather than mechanical means to create a grocery list.

U.S. Pat. No. 4,807,169, issued on Feb. 21, 1989, to Felix J. Overbeck, discloses an electronic information device to aid food preparation, by storing, retrieving and combining menus and recipes, including instructions for food preparation. The instant invention is distinguishable, in that it prepares grocery lists of both food and nonfood items, and does not relate to instructions for food preparation.

U.S. Pat. No. 4,833,632, issued on May 23, 1989, to Toshio Nishimura and Megumi Fukusaki, discloses an electronic record keeping device, for recording numerical data in different areas of memory, where it can be accessed by item keys. The instant invention is distinguishable, in that it has a capability of selecting from a pre-existing list of groceries items a shorter list of those items needed in the immediate future, and processing data about those items.

U.S. Pat. No. 5,237,651, issued on Aug. 17, 1993, to Stephen Randall, discloses an electronic personal organizer, that displays graphics that look like pages of a looseleaf notebook. The instant invention is distinguishable, in that it is specifically designed to create and process lists of grocery items.

U.S. Pat. No. 5,250,789, issued on Oct. 5, 1993, to Edward L. Johnsen, discloses an in-store electronic shopping display system, that is preferably attached to a shopping cart. The instant invention is distinguishable, in that it allows the user to create a shopping list at home, free from control by the store's management.

U.S. Pat. No. 5,253,441, issued on Oct. 19, 1993, to Fred Rachiele and Ray Anderson, discloses a device for listing and marking items and errands, with a plurality of marked tabs inserted into a planar support sheet, having no electronic components, as does the instant invention.

U.S. Pat. No. 5,345,071, issued on Sep. 6, 1994, to Charles Dumont, discloses a shopper's purchase monitoring device, which reads bar codes on items in a store, and computes their total cost. The instant invention is distinguishable, in that it allows the user to create a shopping list at home.

U.S. Pat. No. 5,424,524, issued on Jun. 13, 1995, to Jonathan P. Ruppert and Ronald C. Fish, discloses a personal scanner/computer for displaying shopping lists and scanning bar codes to aid shoppers. The instant invention is distinguishable, in that it is a device that allows users to create their own shopping lists electronically, that does not require the use of a scanner.

U.S. Pat. No. Des. 309,293, issued on Jul. 17, 1990, to Arthur L. Helbig, Jr., discloses a design for a pocket data input/output terminal. U.S. Pat. No. Des. 313,401, issued on Jan. 1, 1991, to Zenya Tanabe, discloses a design for a data entry terminal. U.S. Pat. No. Des. 315,895, issued on Apr. 2, 1991, to Stephen H. Paine and Carl Schofield, discloses a design for a console for a data input/output tablet. None of these design patents disclose a capability of creating and processing grocery lists.

West German Patent No. 2,748,951, published on May 3, 1979, inventor Irma Just, discloses an electronic calculator designed for doing chemical equations. West German Patent No. 2,754,919, published on Jun. 13, 1979, inventor Knut Lanzke, discloses an electronic calculator designed for counting dietary calories. Neither of these calculators are designed to produce grocery shopping lists.

Japanese Patent No. 56-137,460, published on Oct. 27, 1981, inventor Mashahiro Yoshiji, discloses an electronic device, that can calculate the total costs of goods to be purchased, but does not display a list of items on a screen, as does the instant invention.

None of the above inventions and patents, taken either singly or in combination, is seen to describe the instant invention as claimed.

SUMMARY OF THE INVENTION

The present invention relates to an electronic notepad to be called "Mr. Grocery Lister", which stores, displays and prints grocery list items. The device is a computer which stores names of grocery items according to broad classifications. An user may scroll through the names of grocery items which are already loaded into the computer and viewable on a small screen. An example of such items might be meats or vegetables. A user may mark those items he or she desires to purchase and, if wished, may retrieve and (in the second and third embodiments) print all entered items. A first embodiment is portable, and may be taken to a store. A second embodiment is not portable, but includes a printer, by which a grocery list can be printed that can be taken to the store. A third embodiment includes a modem by which a user can shop on-line at grocery stores having the necessary computer hardware and software.

Accordingly, it is a principal object of the invention to help the user record a need for grocery items as it arises.

It is another object of the invention to help the user remember all needed items when going to market.

It is a further object of the invention to print a list of all needed items.

Still another object of the invention is to enable the user to shop electronically.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENTS

The present invention is an electronic grocery lister, having three preferred embodiments.

Figure 1:
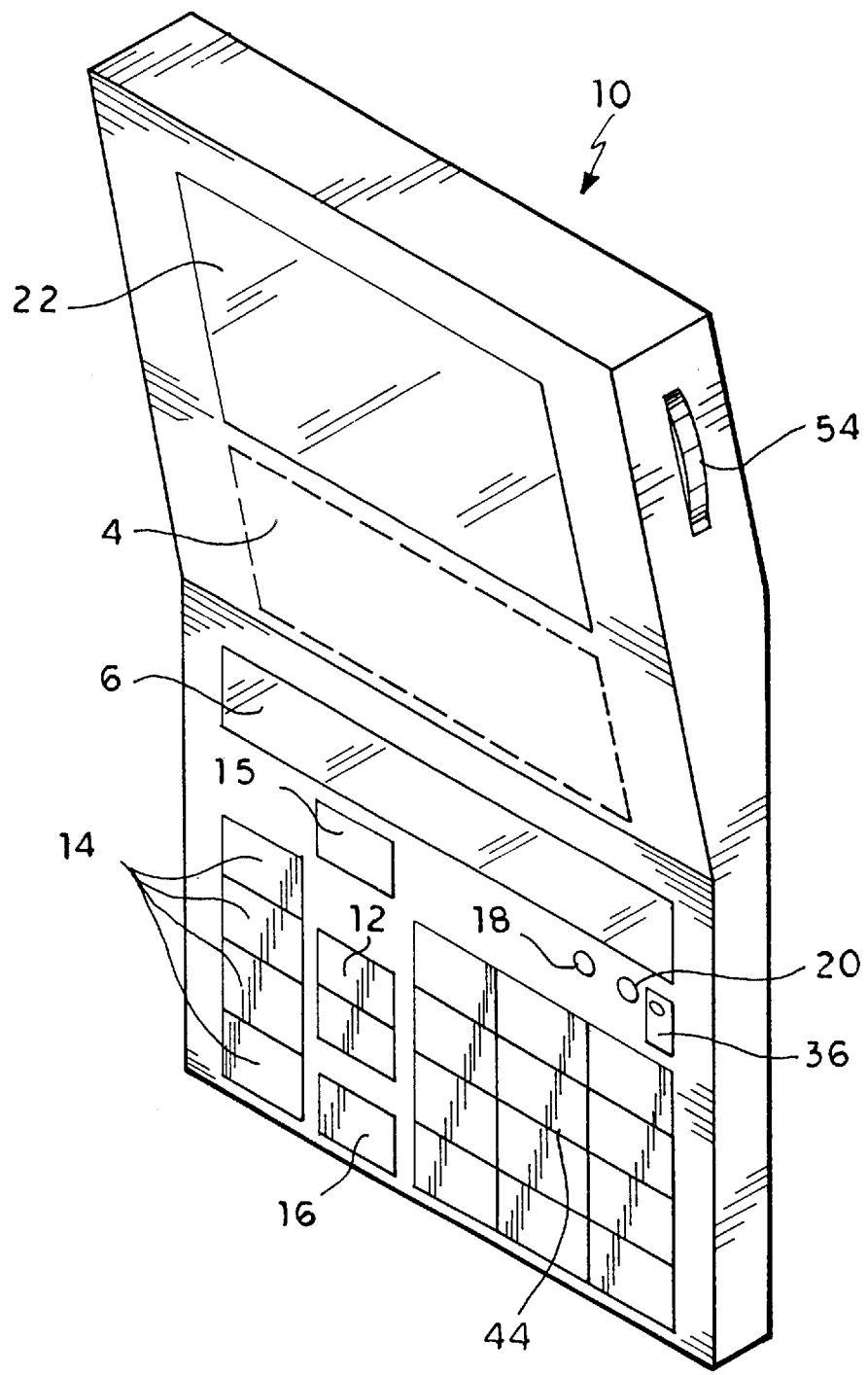
FIG. 1 is a perspective view of a first, smaller embodiment of the invention without a printer slot.

FIG. 1 is a perspective view of the portable first embodiment of the invention generally referred to as 10. At the top a liquid crystal display (LCD) 22 can be seen. This is where the user will see what he or she types in, will choose options off the menu, and will view and edit the grocery list.

Directly below the LCD 22 is an area which has a typed category list 4. This is a list of two hundred most commonly bought items. This list may be changed by the user to fit needs. To the left of each item is a corresponding item code. When the user wishes to enter one of these items quickly, all he or she has to do is press the code and that item will be entered on the database and displayed on LCD 22. Examples of such items could be milk, carrots, or toilet paper.

On the lower part of the invention a long strip can be seen. This is a small solar panel 6. The purpose of the solar panel is to recharge the AA batteries 8 (see FIG. 3). The solar panel 6 is preferably of equal width with the LCD. Below the solar panel is a numeric/letter keypad 44, up and down scroll buttons 12, four category buttons 14, an enter button 15, a delete button 16 and two indicator lights, one green 18 and one red 20. The category buttons 14 allow the user to jump to different categories in the database list displayed on LCD 22. The enter button 15 is used to enter data into the computer. The database list starts out as the same list found on the printed category list 4. This list may be edited by the user if he or she wishes. The delete button 16 is used to delete highlighted items or to backspace over what has been typed. The green indicator light 18 acts as a reminder that a personal message awaits. The red indicator light 20 signifies that the user's predetermined time to go shopping has arrived.

Figure 2:
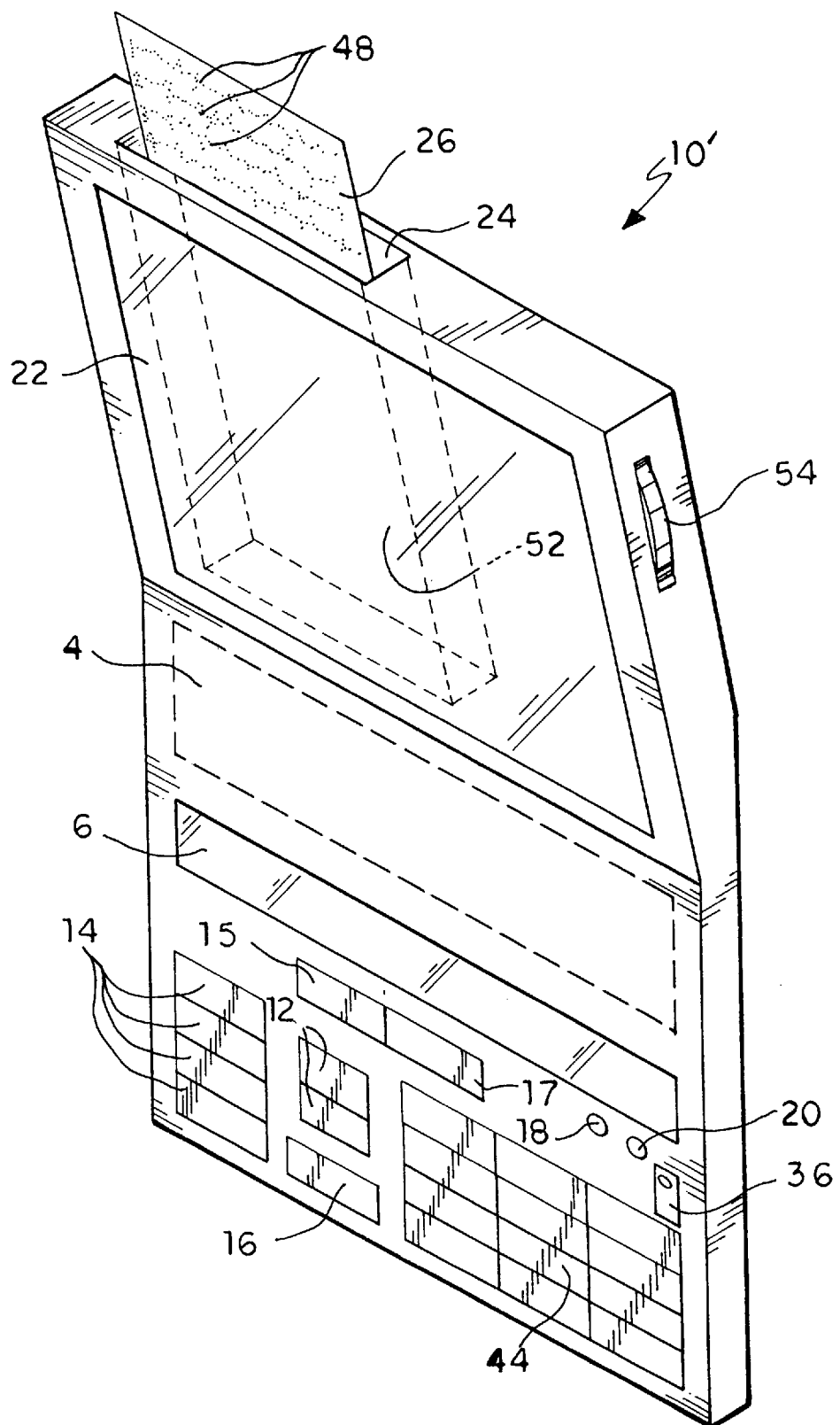
FIG. 2 is a perspective view of a second, larger embodiment of the invention with a printer slot.

FIG. 2 shows the perspective view of the non-portable second embodiment of the invention generally referred to as 10'. As it does not need to be portable, the second embodiment may be larger and heavier than the first embodiment, and has a larger LCD 22. The only difference between this version of the invention and the portable version, other than size, is that this version has a printer 52 and a print button 17. The whole of the printer 52 is inside the invention. The printer slot 24, which has been designed to accept index or note cards 26, is located at the top of the invention. The slot 24 is slightly larger than card 26 and is a quarter inch deeper, allowing the printer 52 to be able to print anywhere on the surface of the card 26. The print button 17 is to the right of the enter button 15.

Figure 3:
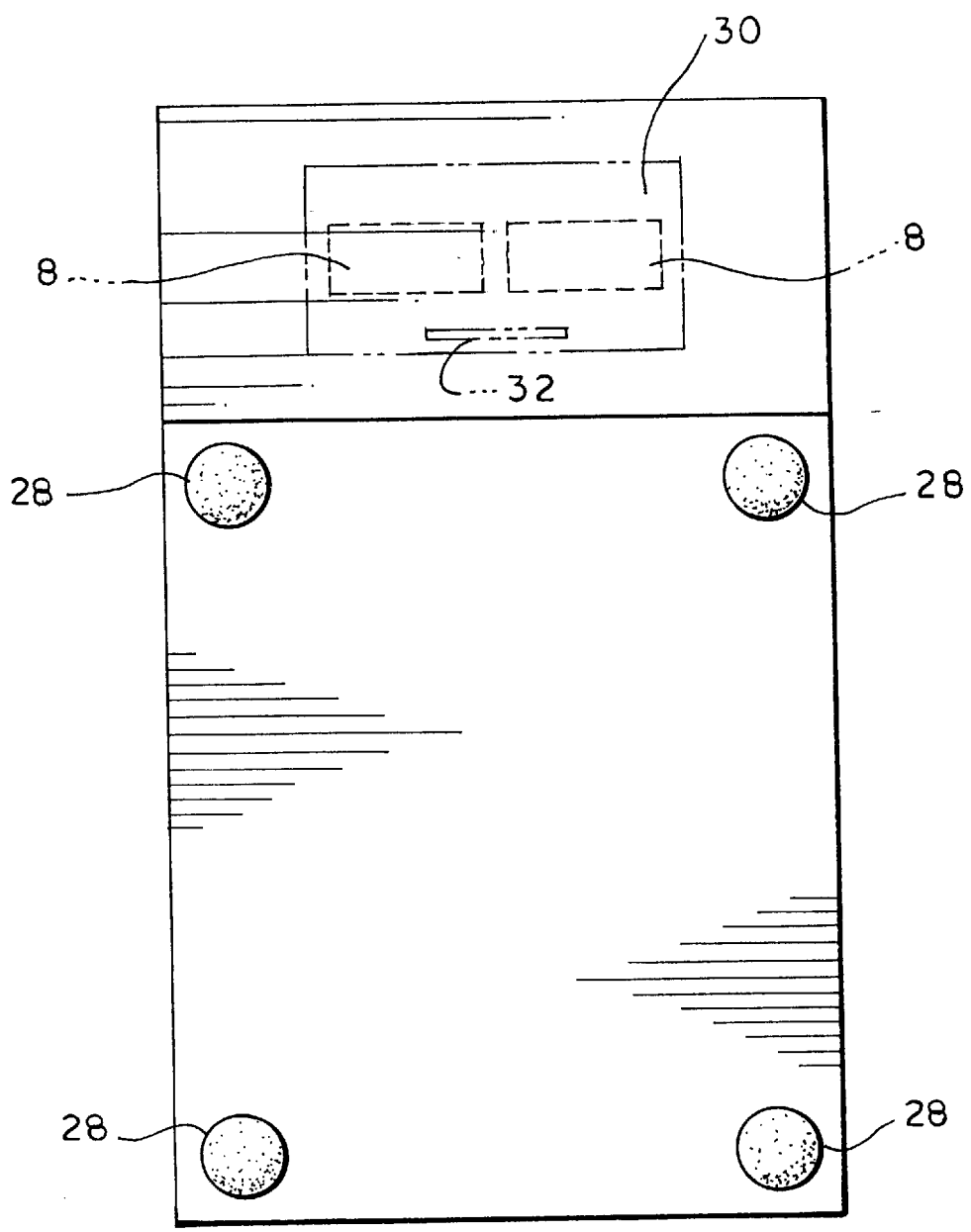
FIG. 3 is a rear, elevational view of the invention, common to both embodiments.

FIG. 3 is a rear elevational view of either embodiment of the invention. The four round objects 28 which can be seen may be either hook and loop fastener tabs or magnets. Also the area where the batteries 8 are located can be seen. The projection tab 32 which is to be used to open the battery cover 30 is also visible. Batteries 8 can be seen behind the battery cover 30.

Figure 4:
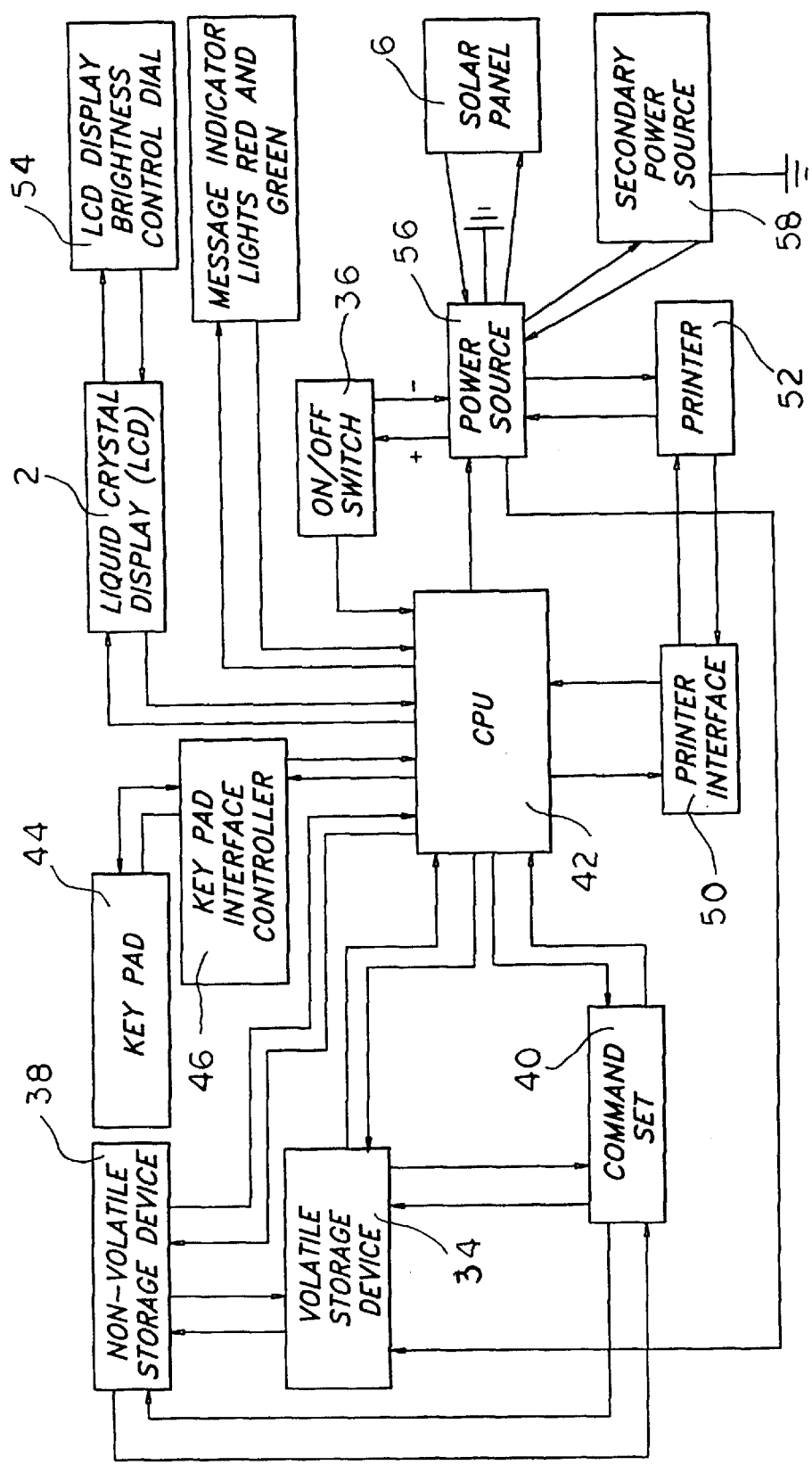
FIG. 4 is a block wiring diagram of the invention.

FIG. 4 shows a block wiring diagram of the invention. Whenever there is enough light falling on the solar panel 6 the invention will resume operation where last left off. If there is not enough light, the invention will drop into a hibernation mode. The state the invention is in at any given time will be dependent upon whether there is enough amperage coming from the solar panel 6 to charge the batteries 8. The inability of the user to use the invention when there is not enough amperage will not be an onus. This is because the only time there will not be enough light for the invention to function is when there is also not enough light for the user to see. When the invention goes into a hibernation mode, the information in the invention at that time will be stored in a volatile storage device 34 which is random access memory (RAM).

Additionally, the invention may be turned off via the on/off switch 36. Turning the invention off will clear the volatile storage device 34 and correspondingly eliminate all stored data. Stored in the non-volatile storage device 38 will be the standard data sets. This data can be modified by the user. The non-volatile storage device 38 will also contain any help menus and other information needed by the command set 40. The command set 40 is the program by which the invention will function. The command set 40 will also need to use the volatile storage device 34 in conjunction with the central processing unit (CPU) 42 in order to function.

The user will control the invention through the buttons 12, 14, 17, as well as through the use of the key pad 44. The commands will travel from the buttons and key pad 44 to the command set 40 via the key pad interface controller 46 and then through the CPU 42. An example of this would be where the user wishes to print his or her grocery list. In order to do this the user would press the print button 17. This would tell the command set 40 to transmit a copy of the list 48 from the volatile storage device 34 to the printer interface 50, which would then spool the information correctly to the printer 52.

Also visible in FIG. 4 is the LCD display brightness display dial 54. This is a variable resistor. To the right of the CPU 42 is the power source 56. This is the pair of AA batteries 8. Below the power source 56 is a secondary power source 58, which is a standard thumbnail battery. The purpose of this secondary power source is so that, when the primary power source 56 is replaced, everything stored in the invention does not have to be lost. Attached to the power source is the solar panel 6 which continuously charges the power source 56. The power source 56 charges the secondary power source 58.

In a third embodiment of the invention (not shown in the drawings) a fax modem is included to allow the grocery lister to send and receive messages. This will enable users of the invention to shop in the comfort of their own home, by just entering the desired items, or retrieving a list that the invention has compiled, and dialing their favorite store to send in their grocery list, provided that the store itself is on-line with the necessary computer hardware and software. In using the third embodiment of the invention, an user would perform the following steps:

1. Enter desired items or retrieve list.
2. Dial the telephone facsimile number of a store that has on-line shopping.
3. Transmit list to the store, and wait for a list check by the store's computer.
4. Enter second choices if the list check shows that some items on the list are out of stock, and whether the user wants to pick up items or have them delivered.

5. After the total bill from the store's computer is displayed on the invention's LCD, the user enters a credit card number and expiration date to make payment.

6. After the estimated time that the items will be ready for pick up or delivery is calculated by the store's computer and displayed on the invention's LCD, the user indicates what time they will pick up or accept delivery of the items.

7. User shows identification to store's personnel when picking up items at store or accepting delivery at home.

It is to be understood that the present invention is not limited to the sole embodiment described above, but encompasses any and all embodiments within the scope of the following claims.

We claim:

1. An electronic grocery lister, comprising:

a central processing unit;

an electric power source, with an on/off switch;

a volatile storage device, with a memory that is cleared when the electric power source is turned off;

a command set containing a program for controlling the grocery lister, using the central processing unit and the volatile storage device;

a non-volatile storage device, with a memory that is not cleared when the electric power source is turned off, containing standard data sets that may be modified by an user, other information needed by the command set, and help menus for the user, with said standard data sets including a plurality of food and nonfood items and their prices per unit;

an alphanumeric keypad by which the user may input data and commands;

a keypad interface controller through which data and commands are transmitted to the central processing unit;

a grocery list of commonly purchased items permanently affixed to an external surface of the grocery lister, said list including a code number indicated for each of the items, whereby a user can select each of the items from the list by entering its code number through the keypad; and a liquid crystal display, whereby the user can see data and commands entered displayed, choose options from menus, and view and edit a grocery list created by selecting from the food and nonfood items, and specifying the quantity for each item, with a capability for calculating and displaying the total price of all the items on the grocery list.

2. The electronic grocery lister according to claim 1, wherein the electric power source is at least one solar panel.

3. The electronic grocery lister according to claim 2, including at least one battery, that is recharged by at least one solar panel, and can function as a secondary electric power source when the solar panel does not receive sufficient light.

4. The electronic grocery lister according to claim 3, including, adjacent to the alphanumeric keypad:

up and down scroll buttons, whereby the user control the part of the grocery list shown in the liquid crystal display;

a plurality of category buttons, whereby the user may select from different categories of items;

an enter button, whereby the user may cause data temporarily stored in the key pad interface controller to enter the central processing unit; and a delete button; whereby the user may delete data temporarily stored in the key pad interface controlled.

5. The electronic grocery lister according to claim 4, including:

a green indicator light, that is turned on as a reminder that a personal message awaits the user; and a red indicator light, that signifies that the user's predetermined time to go shopping has arrived.

6. The electronic grocery lister according to claim 5, wherein the grocery lister will automatically go into a hibernation mode when a drop in current causes the central processing unit to sense that insufficient light is reaching the solar panel, causing the grocery lister to cease operation until sufficient light reaches the solar panel, at which time the hibernation mode will end and operation will be automatically resumed.

7. The electronic grocery lister according to claim 6, wherein there is a dial connected to a variable resistor, by which the user can control the brightness of the liquid crystal display.

8. The electronic grocery lister according to claim 7, wherein there are hook and loop fasteners on an external surface of the grocery lister.

9. The electronic grocery lister according to claim 7, wherein there are magnets on an external surface of the grocery lister.

10. The electronic grocery lister according to claim 7, including:

a printer;

a printer slot through which printed output can exit;

a print button by which the printer can be activated; and a printer interface electrically connected to the printer and the central processing unit.

11. The electronic grocery lister according to claim 10, including:

a facsimile modem, whereby the user can interact on-line with a place of purchase.

12. The electronic grocery lister according to claim 11, in combination with a computer and facsimile modem in the place of purchase, wherein the user is given the capability to shop electronically by a process having the following steps:

a grocery list is created;

the facsimile modems in the grocery lister and the place of purchase are linked;

the grocery list is transmitted to the place of purchase;

the computer in the place of purchase checks the items on the grocery list to determine if the place of purchase is out of stock for any of the items;

the user is informed if any items are out of stock, and given the opportunity to select other items;

the user is asked to choose from the option of picking up the items and the option of having the items delivered;

a total bill for the items is calculated by the computer in the place of purchase and shown of the liquid crystal display of the grocery lister;

the user enters payment data.

\* \* \* \* \*